UNITED STATES PATENT OFFICE.

GEORGES VIGNEAUX, OF PARIS, FRANCE.

PROCESS FOR THE EXTRACTION OF TARTARIC SALTS FROM WASTE TARTROUS MATERIALS.

1,060,869.   Specification of Letters Patent.   Patented May 6, 1913.

No Drawing.   Application filed May 31, 1912.   Serial No. 700,894.

*To all whom it may concern:*

Be it known that I, GEORGES VIGNEAUX, a citizen of the French Republic, and a resident of 11$^{bis}$ Rue du Val de Grâce, Paris, France, have invented a new and useful Improved Process for the Extraction of Tartaric Salts from Waste Tartrous Materials, which process is fully set forth in the following specification.

This invention relates to the extraction and separation of tartaric salts from solutions derived from treating with a dilute mineral acid (usually hydrochloric or sulfuric acid) materials such as tartaric wine lees, grounds, grape skins, and the like, containing tartrous compounds in the form of bitartrate of potassium and tartrate of lime. These materials yield a solution containing tartaric acid, bitartrate of potassium, tartrate of lime, the potassium and calcium salt of the acid used, an excess of this acid, and impurities the nature of which depends on the material treated.

The present invention has for object an improved process for the rapid and economical treatment of this solution.

The main feature of the improved process consists in the introduction into the solution referred to, of a metal which reacts to decompose the free mineral acid. This acid solution before treatment with a metal is in a state of equilibrium corresponding to a certain relation between the concentrations of the bodies entering into it. The introduction of a metal capable of acting on the free mineral acid effects a disturbance of this equilibrium; the quantity of free mineral acid consequently diminishes. There results according to the law of displacement of equilibrium (law of Guldberg and Waag, and studies of Van t'Hoff, etc.) a reaction which tends to produce free mineral acid. This reaction is the inverse reaction of that resulting from the treatment of the original materials by dilute acid. For example, with bitartrate of potassium and hydrochloric acid, the first reaction which occurs (when one treats the primary materials containing bitartrate of potassium by hydrochloric acid) is the following:—

(1)  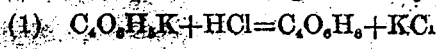

(It goes without saying that the phenomena would be the same if one treated, for example, tartrate of calcium in lieu of tartrate of potassium and if one used some other mineral acid than hydrochloric acid.)

To produce reaction (1) one employs a quantity of hydrochloric acid sufficient to hold in solution all the bitartrate contained in the material treated and separates the solution therefrom. But, like most chemical reactions, reaction (1) is not complete. It proceeds to a certain state of equilibrium following the law of Guldberg and Waag.

(2)  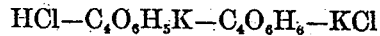

for a given temperature in which equation, $c_1$ is the concentration of the solution in HCl. $c_2$ is the concentration of the solution in $C_4O_6H_5K$. $c_3$ is the concentration of the solution in $C_4O_6H_6$. $c_4$ is the concentration of the solution in KCl. $k$ is, in these conditions, a constant. There results when equilibrium is reëstablished a solution containing the following bodies:

$$HCl - C_4O_6H_5K - C_4O_6H_6 - KCl$$

A metal, iron for example, is then added to the solution. The iron reacts with the hydrochloric acid, an acid stronger than tartaric acid, with formation of chlorid of iron. The presence of chlorid of iron in the solution modifies the conditions of chemical equilibrium, but does not change the form of the relation which expresses this equilibrium, a relation which is always expressed by the form (2). In consequence of the formation of chlorid of iron, the free HCl diminishes in the solution, that is Cl diminishes. There results from this a disturbance in the chemical equilibrium, but it tends, as will be understood, to reëstablish itself. In order that it reëstablish itself, it is necessary that the first member of equation (2) retake the value which it had. For this, it is necessary that $c_3$ and $c_4$ diminish; in consequence $c_2$ increases and the reaction which has occurred is the inverse of that defined in equation (1). The hydrochloric acid thus liberated attacks again the iron as fast as formed; the reaction inverse of the reaction (1) produces itself then with formation of corresponding quantities of bitartrate of potassium.

If the solution is suitably chosen, a moment arrives when the solution is saturated with the bitartrate of potassium a body little soluble which begins then to precipitate.

The reaction ceases when the hydrochloric acid is too dilute to attack the iron which is used in excess. One can arrange matters such that at the temperature employed all the bitartrate formed remains in solution. The solution can be filtered hot and the bitartrate be crystallized out on cooling.

The process is carried out in the following manner: After having separated the solid residue the liquid obtained is treated with a metal, preferably iron, zinc or aluminium. It is not necessary that the metal should be pure, on the contrary it has been found that the presence of foreign bodies in the said metal may in certain cases favor the reaction. The metal is attacked with evolution of hydrogen. If the liquid contained a sufficient proportion of tartaric substances, after a time which depends on this proportion and the quantity of acid used, there is formed a deposit of bitartrate of potassium, or tartrate of lime, or a mixture of these two salts, according to the nature of the materials treated. When the reaction is finished, which is recognized by the fact that the metal ceases to be attacked the liquid is easily separated from the precipitate by decantation or filtration. The liquid separated still contains tartaric substances in solution, so that it should be kept for treatment in further operation, whereby these products can be extracted.

The reaction may be rendered more complete and much more rapid by operating in the hot or by passing through the liquid an electric current of suitable strength and voltage. In this case the electrodes, or the anode at least, are made of the metal which is to take part in the reaction. The electrolytic action produced by the flow of the current favors the reaction and renders it more energetic. The action of heat may be combined with that of electricity.

When the tartarous materials treated contain a large proportion of bitartrate of potassium and tartrate of lime, the bitartrate of potassium will be precipitated first, mixed with a very small quantity of tartrate of lime, and subsequently, on the contrary tartrate of lime with a small amount of bitartrate of potassium. This allows the major part of the bitartrate to be collected separately, then in the same apparatus, the remaining bitartrate and also the tartrate of lime which may be extracted from the product treated. When the process is applied to materials rich in bitartrate, the process may be carried out in the cold with a comparatively small quantity of acidulated water, the solution obtained being easy to bleach and to filter. By subsequently applying the process described to this solution there will be rapidly and directly obtained very pure white cream of tartar. Moreover the nascent hydrogen evolved in the decomposition of the acid by the metal exerts a reducing and bleaching action. This action which is particularly evident when sulfuric acid is used, favors the obtaining of perfectly colorless products. When poor materials are used, such as grape skins, a methodical washing in the cold with an acid is capable of extracting all the tartaric constituents. On subsequently treating the solution by the process just described the bitartrate of potassium and the tartrate of lime contained in these materials are easily extracted.

The carrying out of the present process involves very little expense and the only substance which has to be renewed in the course of the operations is the metal which is attacked by the acid solution with formation of soluble salts. As has been stated any metal can be used and it is not necessary that it be pure; by using iron for example the expense is reduced to a minimum.

It is of advantage to carry out the process in the hot, in order to accelerate the reaction, particularly where iron is the metal employed.

For heating purposes waste industrial heat can be used and where this is not available the fuel consumption can be made small by working with somewhat concentrated solutions derived from the treatment of rich materials.

The apparatus necessary for carrying out this process is of extreme simplicity. The treatment may be carried out in ordinary vats or tubs, preferably of wood, heated by steam, and in which the metal plates are immersed, connected if desired to the terminals of a source of electricity. The precipitation of the tartaric salts takes place simultaneously on the surfaces of the vat, and on the metal plates; it will thus be necessary only to clean these plates from time to time with brushes or scrapers or by immersing them in hot water.

Having now described my invention what I claim as new and desire to secure by Letters Patent is:—

1. A process for the extraction of tartaric salts from waste tartrous materials in which the materials are treated with a dilute mineral acid, the solution obtained brought into contact with a metal which reacts to decompose the free acid of the solution, and the deposit of tartaric salts formed thereby removed by filtration or decantation.

2. A process for the extraction of tartaric salts from waste tartrous materials, in which the materials are treated with a dilute mineral acid, the solution obtained brought in the hot into contact with a metal which reacts to decompose the free acid of the solution, and the deposit of tartaric salts formed thereby removed by filtration or decantation.

3. A process for the extraction of tartaric salts from waste tartrous materials, in which the materials are treated with a dilute mineral acid, the solution obtained subjected to electrolysis using electrodes of a metal which reacts to decompose the free acid of the solution, and the deposit of tartaric salts formed thereby removed by filtration or decantation.

4. A process for the extraction of tartaric salts from waste tartrous materials in which the materials are treated with a dilute mineral acid, the solution obtained subjected to simultaneous heating and electrolysis using electrodes of a metal which reacts to decompose the free acid of the solution, and the deposit of tartaric salts formed thereby removed by filtration or decantation.

5. A process for the extraction of tartaric salts from low grade tartrous materials, in which the materials are washed in the cold with a small quantity of acidulated water, the solution obtained brought into contact with a metal which reacts to decompose the free acid in the liquid, and the deposit of tartaric salt formed thereby removed by filtration or decantation.

In testimony whereof I have signed this specification in the presence of two subscribing witnesses.

GEORGES VIGNEAUX.

Witnesses:
H. C. COXE,
MIGUEL ZEROLO.